US012082753B2

(12) United States Patent
Yan et al.

(10) Patent No.: US 12,082,753 B2
(45) Date of Patent: Sep. 10, 2024

(54) QUICK-RELEASE AND QUICK-INSTALLATION HINGE ASSEMBLY

(71) Applicant: XIAMEN R&T PLUMBING TECHNOLOGY CO., LTD., Xiamen (CN)

(72) Inventors: Weiming Yan, Xiamen (CN); Weiquan Xie, Xiamen (CN)

(73) Assignee: XIAMEN R&T PLUMBING TECHNOLOGY CO., LTD., Xiamen (CN)

( * ) Notice: Subject to any disclaimer, the term of this patent is extended or adjusted under 35 U.S.C. 154(b) by 7 days.

(21) Appl. No.: 18/077,236

(22) Filed: Dec. 8, 2022

(65) Prior Publication Data

US 2024/0041273 A1 Feb. 8, 2024

(30) Foreign Application Priority Data

Aug. 8, 2022 (CN) ......................... 202222076109.6

(51) Int. Cl.
*E05D 7/12* (2006.01)
*A47K 13/12* (2006.01)
*E05D 3/02* (2006.01)

(52) U.S. Cl.
CPC ................ *A47K 13/12* (2013.01); *E05D 3/02* (2013.01); *E05D 7/12* (2013.01); *E05D 2007/128* (2013.01); *E05Y 2999/00* (2024.05)

(58) Field of Classification Search
CPC ....... E05D 11/06; E05D 11/08; E05D 11/082; E05D 11/084; E05D 11/10; E05D 11/105; E05D 11/1064; E05D 2011/1035; E05D 3/02; E05D 7/12; E05D 2007/128; E05Y 2201/638; E05Y 2201/254;
(Continued)

(56) References Cited

U.S. PATENT DOCUMENTS 3,665,552 A * 5/1972 Toldo .................. E05D 11/0054 4/236
3,768,117 A * 10/1973 Toldo ..................... A47K 13/12 4/236
(Continued)

FOREIGN PATENT DOCUMENTS

CN 204541928 U * 8/2015
CN 205649454 U * 10/2016
CN 107233037 A * 10/2017 ............ A47K 13/12

*Primary Examiner* — Chuck Y Mah
(74) *Attorney, Agent, or Firm* — Nitin Kaushik

(57) ABSTRACT

A quick-release and quick-installation hinge assembly includes a hinge to which a toilet lid is rotatably connected, a key plate fixed on a toilet bowl, and a limiting member. The hinge is fixedly provided with a hinge base fitted with the key plate. The hinge base and the key plate are in insertion fit in a lateral direction. The limiting member is provided with an inserting portion. The key plate is provided with an inserting hole that is in insertion fit with the inserting portion for position limitation. The inserting portion is fitted with the inserting hole for position limitation to prevent the hinge base and the key plate from being separated from each other in the lateral direction. The inserting portion penetrates through the inserting hole. The quick-release and quick-installation hinge assembly realizes a stable convenient connection structure between the hinge base of the hinge and the key plate.

16 Claims, 2 Drawing Sheets

(58) Field of Classification Search
CPC ......... E05Y 2201/256; E05Y 2800/298; E05Y 2900/132; E05Y 2900/134; E05Y 2900/20; E05Y 2900/31; E05Y 2900/312; E05Y 2900/614; E05F 3/14; E05F 3/16; E05F 3/20; E05F 5/04; F16C 11/103; Y10T 16/5345; Y10T 16/54038; Y10T 16/54028; A47K 13/12; F05F 2005/046
See application file for complete search history.

(56) References Cited

U.S. PATENT DOCUMENTS

| | | | | | |
|---|---|---|---|---|---|
| 5,906,010 | A * | 5/1999 | Suzuki | A47K 13/12 | 16/342 |
| 6,807,686 | B1 * | 10/2004 | Janes | A47K 13/26 | 4/234 |
| 2011/0067170 | A1 * | 3/2011 | Greenspon | A47K 13/26 | 4/236 |
| 2013/0340154 | A1 * | 12/2013 | Hand | A47K 13/12 | 4/240 |
| 2014/0157500 | A1 * | 6/2014 | Dundas | A47K 13/26 | 4/236 |
| 2019/0000285 | A1 * | 1/2019 | Xu | E05D 7/12 | |
| 2020/0288926 | A1 * | 9/2020 | Gong | A47K 13/26 | |
| 2021/0068597 | A1 * | 3/2021 | Wu | A47K 13/12 | |

* cited by examiner

QUICK-RELEASE AND QUICK-INSTALLATION HINGE ASSEMBLY

CROSS REFERENCE TO THE RELATED APPLICATIONS

This application is based upon and claims priority to Chinese Patent Application No. 202222076109.6, filed on Aug. 8, 2022, the entire contents of which are incorporated herein by reference.

TECHNICAL FIELD

The present disclosure relates to a quick-release and quick-installation hinge assembly.

BACKGROUND

In the prior art, a quick-release structure for a toilet and a lid is proposed to realize quick disassembly of a toilet lid. In the quick-release structure, a rotating hinge is provided at a rear end of the toilet lid, and the rotating hinge is provided with an inserting hole. A fixed support base is provided on a toilet bowl, and the fixed support base is provided with an inserting shaft. The inserting shaft and the inserting hole are in insertion fit to fix the toilet lid on the toilet bowl. The toilet lid can be quickly disassembled and assembled through an inserting operation and a pull-out operation, which is convenient and avoids the need for a tool.

However, in the toilet lid that adopts the inserting shaft and the inserting hole for disassembly and assembly, the lid hinge is inserted into or pulled out of the fixed support base only through the inserting shaft. As a result, the overall firmness of the lid hinge is poor, which may lead to the problem where the lid is unstable and easy to shake after being mounted. Moreover, the hinge has the risk of being separated from the support base when the lid is subjected to a large external force.

SUMMARY

To solve the above problems, the present disclosure provides a quick-release and quick-installation hinge assembly. The present disclosure designs a limiting member with a limiting portion and a locking portion, which achieves a stable, simple, and convenient connection structure between a hinge base of a hinge and a key plate.

To achieve the above objective, the present disclosure adopts the following technical solution:

The quick-release and quick-installation hinge assembly includes a hinge to which a toilet lid is rotatably connected and a key plate fixed on a toilet bowl. The hinge is fixedly provided with a hinge base fitted with the key plate. The hinge base and the key plate are in insertion fit in a lateral direction. The quick-release and quick-installation hinge assembly further includes a limiting member. The limiting member is provided with an inserting portion. The key plate is provided with an inserting hole that is in insertion fit with the inserting portion for position limitation. The inserting portion is fitted with the inserting hole for position limitation to prevent the hinge base and the key plate from being separated from each other in the lateral direction. The inserting portion penetrates through the inserting hole.

Preferably, a top wall of the hinge base is provided with a through hole through which the inserting portion passes, and a bottom wall of the hinge base is provided with a location portion. An upper part of the inserting portion is fitted with the through hole for position limitation, and a lower part of the inserting portion is fitted with the location portion for position limitation. The key plate is located between the top wall and the bottom wall of the hinge base. The inserting portion is fitted with the through hole, the inserting hole, and the location portion in sequence from top to bottom.

Preferably, the location portion is a location hole or a location slot. The inserting portion passes through the through hole and the inserting hole in sequence from top to bottom to be inserted into the location portion.

Preferably, the hinge base is provided with a cavity into which the key plate is inserted. A side of the cavity is provided with an opening. The key plate is inserted into the cavity through the opening in the lateral direction and is fitted with a bottom wall of the hinge base for position limitation in a longitudinal direction.

Preferably, the limiting member is further provided with a front baffle corresponding to the opening. The front baffle is configured to prevent the key plate from exiting the cavity in the lateral direction.

Preferably, the front baffle and the opening are identical in shape and size.

Preferably, the limiting member is further provided with a connecting portion that is fitted with the hinge base and the key plate for position limitation.

Preferably, the connecting portion is connected to a top wall of the hinge base, or the connecting portion is connected to an outer side wall of the hinge base.

Preferably, the outer side wall of the hinge base is provided with a locking portion. The connecting portion is locked with the locking portion. One of the locking portion and the connecting portion is a locking piece, and the other of the locking portion and the connecting portion is a locking slot.

Preferably, the locking portion is located at the bottom of the outer side wall of the hinge base.

Preferably, the outer side wall of the hinge base is provided with a guide slot arranged in the longitudinal direction. The locking portion is a locking slot that communicates with the guide slot, and the connecting portion is a locking piece that is locked with the locking slot. The connecting portion is locked into the locking slot along the guide slot.

Preferably, the limiting member is further provided with a side baffle configured to cover an outer side wall of the hinge base.

Preferably, the side baffle and the outer side wall of the hinge base are identical in shape and size.

Preferably, the limiting member includes a buckle cover configured to cover the hinge base, and a side of the buckle cover is pivotally or flexibly connected to the hinge base.

Preferably, the buckle cover and a top wall of the hinge base are identical in shape and size.

Preferably, the key plate is fixed on the toilet bowl by a fastener.

Preferably, the limiting member is further provided with a connecting portion that is fitted with the hinge base or the key plate for position limitation.

The present disclosure has the following advantages.

1. In the present disclosure, the quick-release and quick-installation hinge assembly includes a hinge to which a toilet lid is rotatably connected and a key plate fixed on a toilet bowl. The hinge is fixedly provided with a hinge base fitted with the key plate. The hinge base and the key plate are in insertion fit in a lateral direction. The quick-release and quick-installation hinge assembly further includes a limiting member. The limiting member is provided with an inserting portion. The key plate is provided with an inserting hole that is in insertion fit with the inserting portion for position limitation. The inserting portion is fitted with the inserting hole for position limitation to prevent the hinge base and the key plate from being separated from each other in the lateral direction. The inserting portion penetrates through the inserting hole. By arranging the inserting portion that penetrates through the inserting hole of the key plate, the present disclosure realizes a stable, simple, and convenient connection structure between the hinge base of the hinge and the key plate.

2. In the present disclosure, a top wall of the hinge base is provided with a through hole through which the inserting portion passes, and a bottom wall of the hinge base is provided with a location portion. An upper part of the inserting portion is fitted with the through hole for position limitation, and a lower part of the inserting portion is fitted with the location portion for position limitation. The inserting portion penetrates through the inserting hole of the key plate, and two ends of the inserting portion are fitted with the hinge base for position limitation. In this way, forces acting on the inserting portion are balanced to prevent the inserting portion from breaking. In addition, the structure is stable and compact and saves the product space.
3. In the present disclosure, the limiting member is further provided with a side baffle configured to cover an outer side wall of the hinge base. Through the design, the hinge base forms a fully enclosing structure, which improves the integrity of the appearance.
4. In the present disclosure, the limiting member includes a buckle cover configured to cover the hinge base, and a side of the buckle cover is pivotally or flexibly connected to the hinge base. The design realizes convenient mounting, prevents the loss of the limiting member, and has desired product integrity.

BRIEF DESCRIPTION OF THE DRAWINGS

The drawings described here are provided for further understanding of the present disclosure and constitute a part of the present disclosure. The exemplary embodiments of the present disclosure and illustrations thereof are intended to explain the present disclosure, rather than to constitute inappropriate limitations to the present disclosure. Drawings.

Figure 1:
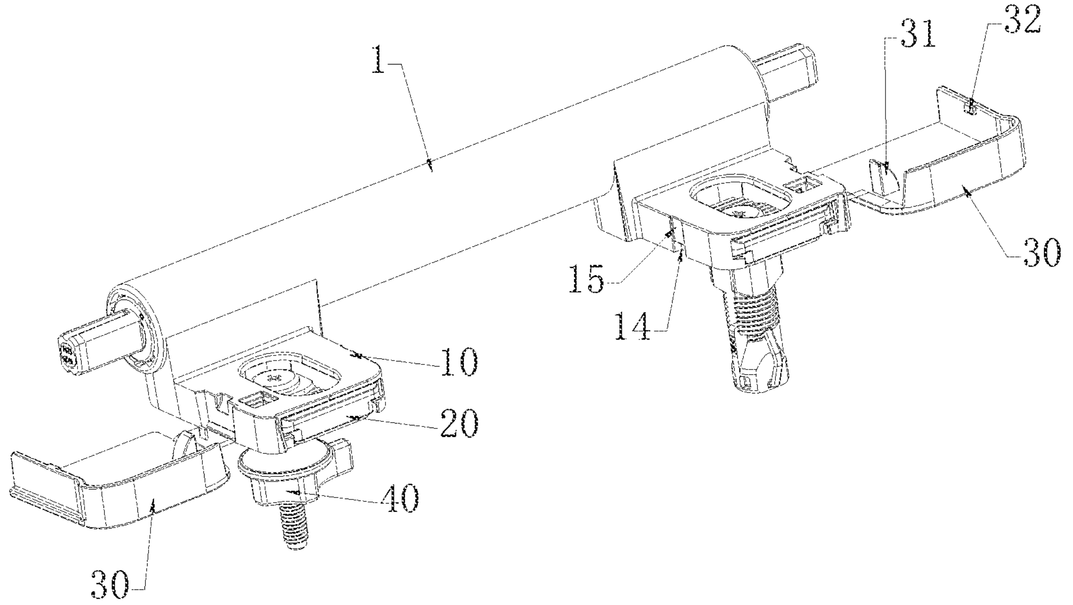
FIG. 1 is a three-dimensional view of a quick-release and quick-installation hinge assembly according to the present disclosure.

Reference Numerals: 1. hinge; 10. hinge base; 11. cavity; 111. opening; 12. through hole; 13. location portion; 14. locking portion; 15. guide slot; 20. key plate; 21. inserting hole; 30. limiting member; 31. inserting portion; 32. connecting portion; 33. front baffle; 34. side baffle; 35. buckle cover; and 40. fastener.

DETAILED DESCRIPTION OF THE EMBODIMENTS

To make the to-be-resolved technical problems, technical solutions, and advantages of the present disclosure clearer, the present disclosure is described in further detail below with reference to the drawings and embodiments. Understandably, the described embodiments are merely intended to explain the present disclosure, rather than to limit the present disclosure.

Figure 2:
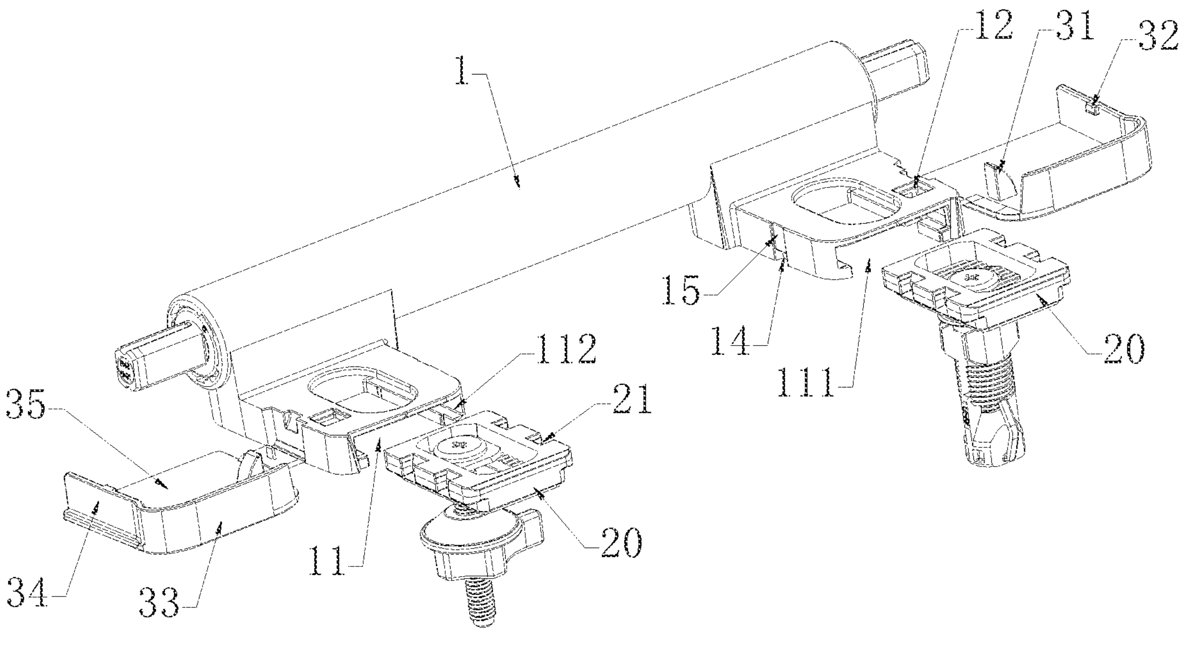
FIG. 2 is an exploded view of the quick-release and quick-installation hinge assembly according to the present disclosure.
Figure 3:
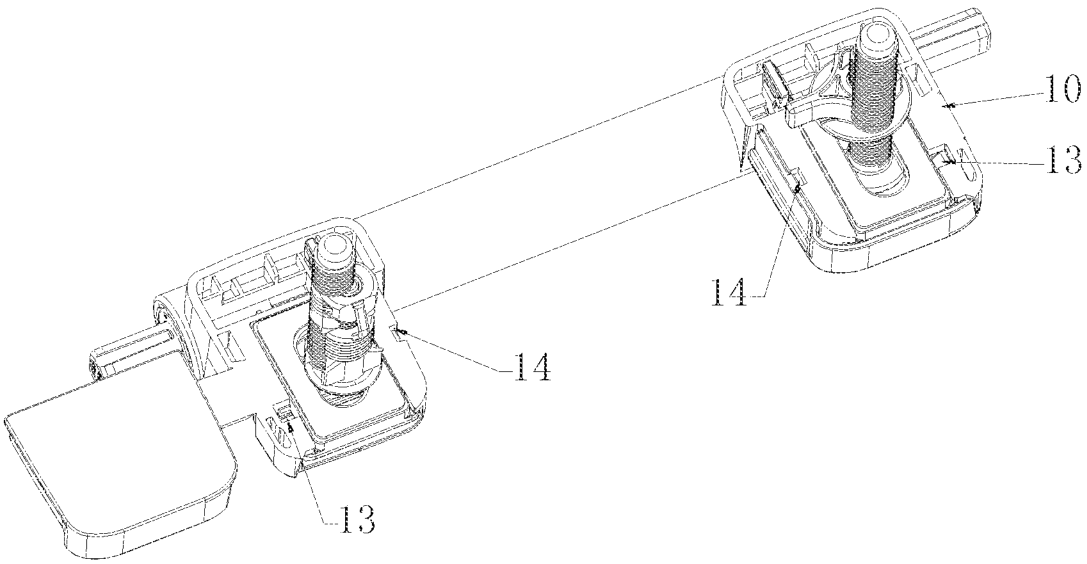
FIG. 3 is a three-dimensional view of the quick-release and quick-installation hinge assembly from another angle according to the present disclosure.
Figure 4:
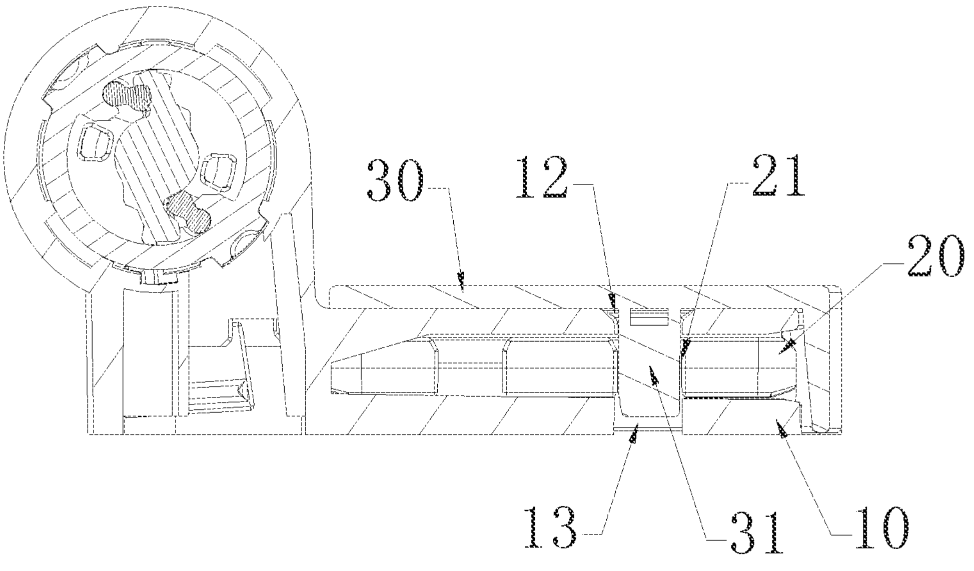
FIG. 4 is a sectional view of the quick-release and quick-installation hinge assembly according to the present disclosure.

As shown in FIGS. 1 to 4, a quick-release and quick-installation hinge assembly 1 includes the hinge 1 to which a toilet lid is rotatably connected and the key plate 20 fixed on a toilet bowl. The hinge 1 is fixedly provided with the hinge base 10 fitted with the key plate 20. The hinge base 10 and the key plate 20 are in insertion fit in a lateral direction. The quick-release and quick-installation hinge assembly further includes the limiting member 30. The limiting member 30 is provided with the inserting portion 31. The key plate 20 is provided with the inserting hole 21 that is in insertion fit with the inserting portion 31 for position limitation. The inserting portion 31 is fitted with the inserting hole 21 for position limitation to prevent the hinge base 10 and the key plate 20 from being separated from each other in the lateral direction. The inserting portion 31 penetrates through the inserting hole 21.

In the present embodiment, a top wall of the hinge base 10 is provided with the through hole 12 through which the inserting portion 31 passes, and a bottom wall of the hinge base 10 is provided with the location portion 13. An upper part of the inserting portion 31 is fitted with the through hole 12 for position limitation, and a lower part of the inserting portion 31 is fitted with the location portion 13 for position limitation. The inserting portion 31 penetrates through the inserting hole 21 of the key plate 20, and two ends of the inserting portion 31 are fitted with the hinge base 10 for position limitation. The key plate 20 is located between the top wall and the bottom wall of the hinge base 10. The inserting portion 31 is fitted with the through hole 12, the inserting hole 21, and the location portion 13 in sequence from top to bottom, such that forces acting on the inserting portion 31 are balanced to prevent the inserting portion 31 from breaking.

In the present embodiment, the location portion 13 is a location hole or a location slot. Specifically, the location portion 13 is a location hole provided in the bottom wall of the hinge base 10, and the inserting portion 31 passes through the through hole 12 and the inserting hole 21 in sequence from top to bottom to be inserted into the location portion.

In the present embodiment, the hinge base 10 is provided with the cavity 11 into which the key plate 20 is inserted. A side of the cavity 11 is provided with the opening 111. The key plate 20 is inserted into the cavity 11 through the opening 111 in the lateral direction and is fitted with the bottom wall of the hinge base 10 for position limitation in a longitudinal direction.

In the present embodiment, the limiting member 30 is further provided with the front baffle 33 corresponding to the opening 111. The front baffle 33 is configured to prevent the key plate 20 from exiting the cavity 11 in the lateral direction.

In the present embodiment, the front baffle 33 and the opening 111 are identical in shape and size.

In the present embodiment, the limiting member 30 is further provided with the connecting portion 32 that is fitted with the hinge base 10 and the key plate 20 for position limitation. Specifically, the connecting portion 32 is fitted with the hinge base 10 for position limitation.

In the present embodiment, the connecting portion 32 is connected to an outer side wall of the hinge base 10.

In other embodiments, the connecting portion 32 is connected to the top wall of the hinge base 10. For example, the top wall of the hinge base 10 is provided with a fitting hole, and the connecting portion 32 is an inserting shaft that is in interference fit with the fitting hole.

In the present embodiment, the outer side wall of the hinge base 10 is provided with the locking portion 14. The connecting portion 32 is locked with the locking portion 14. One of the locking portion 14 and the connecting portion 32 is a locking piece, and the other of the locking portion 14 and the connecting portion 32 is a locking slot.

In the present embodiment, the locking portion 14 is located at the bottom of the outer side wall of the hinge base 10.

In the present embodiment, the outer side wall of the hinge base 10 is provided with the guide slot 15 arranged in the longitudinal direction. The locking portion 14 is a locking slot that communicates with the guide slot 15, and the connecting portion 32 is a locking piece that is locked with the locking slot. The connecting portion 32 is locked into the locking slot along the guide slot 15.

In the present embodiment, the limiting member 30 is further provided with the side baffle 34 configured to cover the outer side wall of the hinge base 10. Specifically, the connecting portion 32 is provided at the bottom of the side baffle 34.

In the present embodiment, the side baffle 34 and the outer side wall of the hinge base 10 are identical in shape and size.

In the present embodiment, the limiting member 30 includes the buckle cover 35 configured to cover the hinge base 10. One side of the buckle cover 35 is pivotally or flexibly connected to the hinge base 10, and the side baffle 34 is located on the other side of the buckle cover 35.

In the present embodiment, the buckle cover 35 and the top wall of the hinge base 10 are identical in shape and size.

In the present embodiment, the key plate 20 is fixed on the toilet bowl by the fastener 40.

In the present embodiment, the limiting member 30 is further provided with the connecting portion 32 that is fitted with the hinge base 10 or the key plate 20 for position limitation. Specifically, the connecting portion 32 is fitted with the hinge base 10 for position limitation.

In the present embodiment, two inserting holes 21 are arranged symmetrically along the lateral direction of the key plate 20, and/or two inserting holes 21 are arranged symmetrically along the longitudinal direction of the key plate 20. In this way, the key plate 20 can be blindly mounted, and the inserting portion 31 and the inserting hole 21 can be fitted with each other for position limitation either when the key plate 20 is mounted forwardly or reversely.

The working process of the present embodiment is as follows:

During disassembly, the connecting portion 32 of the limiting member 30 is separated from the locking portion 14 of the hinge base 10. The limiting member 30 is rotated and opened to separate the inserting portion 31 from the inserting hole 21 of the key plate 20, to release the lateral limit on the hinge base 10 and the key plate 20. The hinge 1 is pushed in the lateral direction to make the hinge base 10 exit the key plate 20 in the lateral direction, to release the longitudinal limit on the hinge base 10 and the key plate 20. In this way, the hinge base 10 is separated from the key plate 20, and the disassembly of the hinge 1 is completed.

By arranging the inserting portion 31 that penetrates through the inserting hole 21 of the key plate 20, the present disclosure realizes a stable, simple, and convenient connection structure between the hinge base 10 of the hinge land the key plate 20.

The preferred embodiments of the present disclosure are described above. But as mentioned above, it should be understood that the present disclosure is not limited to the form disclosed herein and should not be regarded as an exclusion of other embodiments. The present disclosure also applies to various combinations, modifications and scenarios in other form, and changes can be made through the above guides or the technologies or knowledge in the related fields within the scope of conception of the present disclosure described herein. Changes and variations made by those skilled in the art without departing from the spirit and scope of the present disclosure shall fall within the scope of protection of the appended claims of the present disclosure.

What is claimed is:

1. A quick-release and quick-installation hinge assembly, comprising:

a hinge, wherein a toilet lid is rotatably connected to the hinge;

a key plate, wherein the key plate is fixed on a toilet bowl, wherein the hinge is fixedly provided with a hinge base fitted with the key plate; the hinge base and the key plate are in insertion fit in a horizontal direction;

and a limiting member;

the limiting member is provided with an inserting portion; the key plate is provided with an inserting hole, wherein the inserting hole is in insertion fit with the inserting portion for position limitation; the inserting portion is fitted with the inserting hole for position limitation to prevent the hinge base and the key plate from being separated from each other in the horizontal direction; and the inserting portion penetrates through the inserting hole;

wherein the limiting member is further provided with a connecting portion, wherein the connecting portion is fitted with the hinge base and the key plate for position limitation, wherein the connecting portion is connected to a top wall of the hinge base, or the connecting portion is connected to an outer side wall of the hinge base.

2. The quick-release and quick-installation hinge assembly according to claim 1, wherein a top wall of the hinge base is provided with a through hole, wherein the inserting portion passes through the through hole, and a bottom wall of the hinge base is provided with a location portion; an upper part of the inserting portion is fitted with the through hole for position limitation, and a lower part of the inserting portion is fitted with the location portion for position limitation; the key plate is located between the top wall and the bottom wall of the hinge base; and the inserting portion is fitted with the through hole, the inserting hole, and the location portion in sequence from top to bottom.

3. The quick-release and quick-installation hinge assembly according to claim 2, wherein the location portion is a location hole or a location slot; and the inserting portion passes through the through hole and the inserting hole in sequence from top to bottom to be inserted into the location portion.

4. The quick-release and quick-installation hinge assembly according to claim 1, wherein the hinge base is provided with a cavity, wherein the key plate is inserted into the cavity; a side of the cavity is provided with an opening; and the key plate is inserted into the cavity through the opening in the horizontal direction and is fitted with a bottom wall of the hinge base for position limitation in a longitudinal direction.

5. The quick-release and quick-installation hinge assembly according to claim 4, wherein the limiting member is further provided with a front baffle corresponding to the opening; and the front baffle is configured to prevent the key plate from exiting the cavity in the horizontal direction.

6. The quick-release and quick-installation hinge assembly according to claim 5, wherein the front baffle and the opening are identical in shape and size.

7. The quick-release and quick-installation hinge assembly according to claim 1, wherein the outer side wall of the hinge base is provided with a locking portion; the connecting portion is used to lock with the locking portion; and one of the locking portion and the connecting portion is a locking piece, and the other of the locking portion and the connecting portion is a locking slot.

8. The quick-release and quick-installation hinge assembly according to claim 7, wherein the locking portion is located at a bottom of the outer side wall of the hinge base.

9. The quick-release and quick-installation hinge assembly according to claim 8, wherein the outer side wall of the hinge base is further provided with a guide slot arranged in a longitudinal direction; the locking portion is a locking slot, wherein the locking slot communicates with the guide slot; the connecting portion is a locking piece, wherein the locking piece is locked with the locking slot; and the connecting portion is locked into the locking slot along the guide slot.

10. The quick-release and quick-installation hinge assembly according to claim 1, wherein the limiting member is further provided with a side baffle, wherein the side baffle is configured to cover an outer side wall of the hinge base.

11. The quick-release and quick-installation hinge assembly according to claim 10, wherein the side baffle and the outer side wall of the hinge base are identical in shape and size.

12. The quick-release and quick-installation hinge assembly according to claim 1, wherein the limiting member comprises a buckle cover, wherein the buckle cover is configured to cover the hinge base, and a side of the buckle cover is pivotally or flexibly connected to the hinge base.

13. The quick-release and quick-installation hinge assembly according to claim 12, wherein the buckle cover and a top wall of the hinge base are identical in shape and size.

14. The quick-release and quick-installation hinge assembly according to claim 1, wherein the key plate is fixed on the toilet bowl by a fastener.

15. The quick-release and quick-installation hinge assembly according to claim 1, wherein the limiting member is further provided with a connecting portion, wherein the connecting portion is fitted with the hinge base or the key plate for position limitation.

16. The quick-release and quick-installation hinge assembly according to claim 1, wherein the connecting portion comprises a locking piece or a locking slot to lock with a locking portion of the hinge base.

* * * * *